Aug. 8, 1944. J. A. BOMBARDIER 2,355,266
TRACTION DEVICE
Filed July 10, 1943
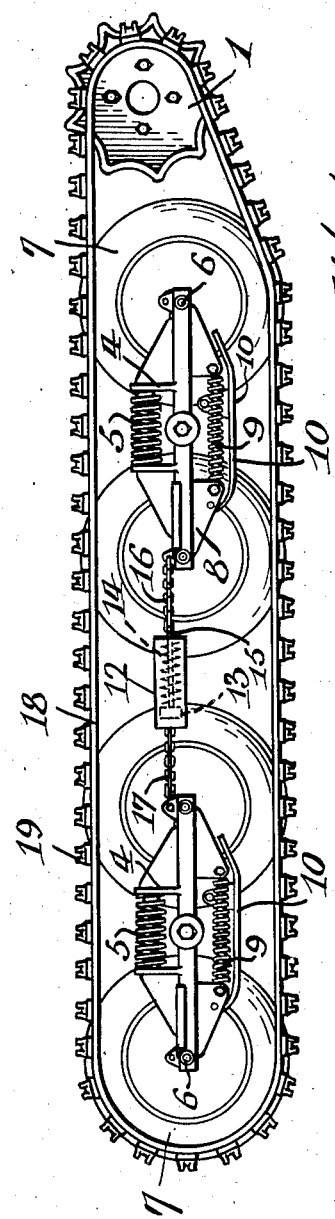
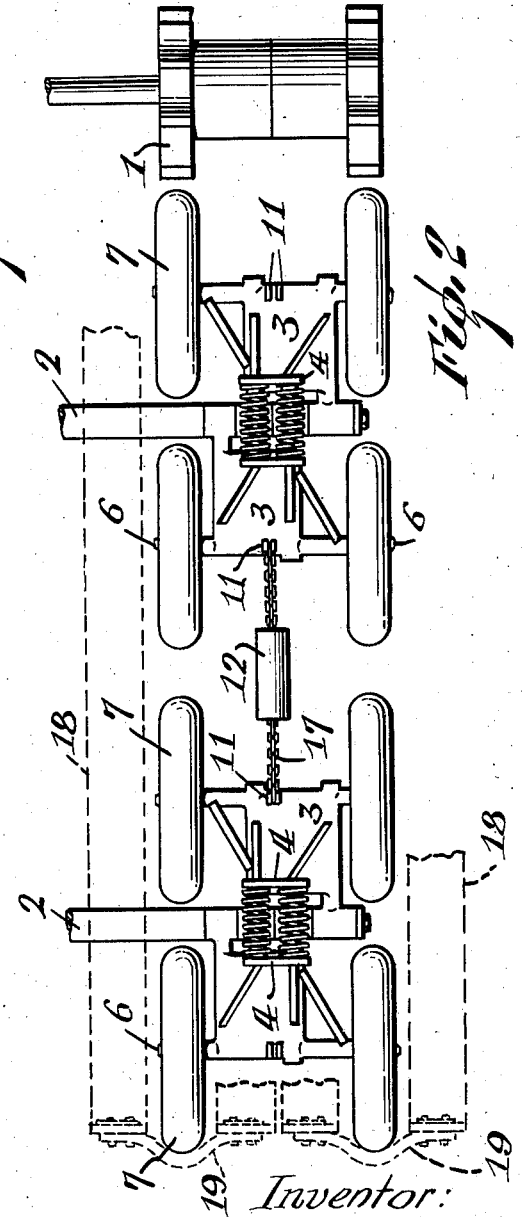
Inventor:
Joseph Armand Bombardier
By
Attorney Patented Aug. 8, 1944

2,355,266

UNITED STATES PATENT OFFICE 2,355,266

TRACTION DEVICE

Joseph Armand Bombardier, Valcourt, Quebec, Canada

Application July 10, 1943, Serial No. 494,147

3 Claims. (Cl. 280—81)

The present invention pertains to a novel traction device for multi-wheeled vehicles.

The principal object is to provide a yielding longitudinal connection between adjacent suspension units, whereby to equalize their movements and to prevent them from tilting excessively.

Each such unit is preferably an articulated, spring tensioned structure mounted on alined wheels. At least two units are required in a heavy vehicle and are spaced apart lengthwise of the vehicle. They are independent of each other except for the connection disclosed herein.

The connection is designed to elongate yieldingly and consists of a flexible member, such as a chain, with a yielding device inserted therein such device may take various equivalent forms and consists preferably of a cylinder and spring backed pistons connected respectively to severed parts of the chain.

The invention is applicable equally to conventional and dual wheeled vehicles.

The invention is fully disclosed by way of example in the following description and in the accompanying drawing in which:

Figure 1 is a side elevation of an assembly embodying the invention, and

Figure 2 is a plan view thereof.

Reference to these views will now be made by use of like characters which are employed to designate corresponding parts throughout.

The invention is illustrated as applied to a track-laying vehicle. The sprocket 1 may be considered the driver. The assembly includes a plurality of dual wheel suspension units, in this case two.

Each unit includes, as in my co-pending application Serial No. 491,315, filed June 18, 1943, a transverse shaft 2 to which are hinged oppositely extending horizontal plates 3. Each plate carries a vertical transverse retaining plate 4 on its upper surface, and between the opposed plates 4 are inserted compressed springs 5 crossing the hinge axis.

The shafts 2 are shown under load, thereby holding the springs in compression and substantially horizontal. Unloaded, the springs tend to spread the plates 4, raise the shaft 2 and bow upward. The free transverse edges of the plates 2 carry axles 6 and wheels 7 riding on the ground or on a track, as will presently be shown.

The lower surface of each plate 3 has a depending web 8, and opposed webs are joined by springs 9 opposing the springs 5. A shield plate 10 is supported beneath the springs 9 to protect them from packing snow and ice, as in the aforementioned application.

The free transverse edges of the plates 2 are provided with lugs or ears 11 for joining a pair of suspension units. The connection includes a cylinder 12 containing a piston 13 and a compressible agent such as a spring 14. A piston rod 15 extending from the piston is joined to one of the units by a chain 16. The cylinder is joined to the other unit by a chain 17. This connection between the units divides or equalizes their movement and prevents excessive swinging and a tendency to invert under unusual conditions.

As shown, the axles 6 support dual wheels. However, the invention is equally applicable to single, alined wheels. In such case, the units are narrow, the spring structures lighter, and each axle carries one wheel.

The track surrounds the wheels 7 and sprocket 1 and is formed of two bands 18 at opposite sides of each set of alined tires, joined by bars 19 across the respective tires. Obviously, any other desired type of track may be used, or the wheels may run directly on the ground.

Although a specific embodiment of the invention has been illustrated and described, it will be understood that various alterations in the details of construction may be made without departing from the scope of the invention as indicated by the appended claims.

What I claim as my invention is:

1. In a traction device, a pair of wheeled units in alinement with each other, and spaced apart, each unit including a pair of hingedly and resiliently connected plates and wheels carried thereby, a flexible connection between said units, and resilient means in said connection.

2. In a traction device, a pair of wheeled units in alinement with each other, and spaced apart, each unit including a pair of hingedly and resiliently connected plates and wheels carried thereby, a flexible connection between said units, a cylinder and a piston inserted in said connection, the piston being fitted in the cylinder, and resilient means bearing against said piston and an end of said cylinder.

3. In a traction device, a pair of wheeled units in alinement with each other, and spaced apart, each unit including a pair of hingedly and resiliently connected plates and wheels carried thereby, a flexible connection between said units, a cylinder and a piston inserted in said connection, the piston being fitted in the cylinder, a spring bearing against said piston and surrounding a portion of the flexible connection attached to the piston.

JOSEPH ARMAND BOMBARDIER.